United States Patent [19]
Dietze et al.
[11] 3,900,039
[45] Aug. 19, 1975

[54] METHOD OF PRODUCING SHAPED SEMICONDUCTOR BODIES

[75] Inventors: Wolfgang Dietze; Manfred Schnöller; Tomislav Mladenovich; Werner Baumgartner, all of Munich, Germany

[73] Assignee: Siemens Aktiengesellschaft, Berlin & Munich, Germany

[22] Filed: Oct. 29, 1973

[21] Appl. No.: 410,890

[30] Foreign Application Priority Data

Oct. 31, 1972 Germany.......................... 2253498

[52] U.S. Cl. .................. 134/3; 117/106 A; 134/28; 134/39; 423/349; 423/460
[51] Int. Cl........................... B08b 9/00; C23c 11/06
[58] Field of Search.............. 117/106 RA, 228, 66; 156/5, 6, 7, 18, 25; 423/348, 349, 350, 448, 460, 461; 148/175; 134/3, 22 R, 39, 28

[56] References Cited

UNITED STATES PATENTS

| | | | |
|---|---|---|---|
| 2,256,449 | 9/1941 | George | 134/39 |
| 2,287,111 | 6/1942 | Loud | 134/39 |
| 3,004,835 | 10/1961 | Verner et al. | 156/25 |
| 3,139,363 | 6/1964 | Baldrey | 156/25 |
| 3,147,141 | 9/1964 | Ishizuka | 423/349 |
| 3,216,857 | 11/1965 | Duvall | 134/39 |
| 3,336,148 | 8/1967 | Gunnell et al. | 423/460 |
| 3,404,061 | 10/1968 | Shane et al. | 423/460 |
| 3,694,264 | 9/1972 | Weinland et al. | 134/3 |
| 3,751,539 | 8/1973 | Reuschel et al. | 117/106 A |
| 3,824,121 | 7/1974 | Bradley et al. | 117/106 A |
| 3,853,974 | 12/1974 | Reuschel et al. | 117/106 A |

OTHER PUBLICATIONS

Hackh's Chemical Dictionary, 1969, pp. 306.

*Primary Examiner*—Charles E. Van Horn
*Assistant Examiner*— Massie
*Attorney, Agent, or Firm*—Hill, Gross, Simpson, Van Santen, Steadman, Chiara & Simpson

[57] ABSTRACT

A method of removing a graphite carrier member supporting a semiconductor body without damaging such body by disintegrating the carrier member at room temperature with the aid of a concentrated highly oxidizing agent, such as fuming nitric or chromosulfuric acid.

2 Claims, No Drawings

METHOD OF PRODUCING SHAPED SEMICONDUCTOR BODIES

BACKGROUND OF THE INVENTION

1. Field of the Invention

The invention relates to production of shaped semiconductor bodies and somewhat more particularly to a method of producing hollow semiconductor bodies open at least at one end thereof whereby a graphite carrier member supporting such semiconductor body is removed without destroying the semiconductor body.

2. Prior Art

German Pat. No. 1,805,970 described a method of producing hollow semiconductor bodies, for example, composed of silicon, wherein a thermally decomposable gaseous semiconductor compound is brought into contact with heated surfaces of a graphite carrier member and decomposed to yield a semiconductor material which is deposited on the carrier member surfaces. After the deposition process is completed, the system is cooled and the carrier member is removed without destroying the formed semiconductor body. If the carrier member is composed of an easily combustible material, such as graphite, it can be removed from the hollow semiconductor body by burning the carrier member in air or in an oxygen-rich atmosphere. Otherwise, the joined carrier member-semiconductor body system can be reheated so that the different degrees of expansion of the individual elements of the system allow mechanical separation. In either case, the semiconductor body must be subjected to relatively high thermal stresses which cause minute discontinuities, such as fractures or fine hairline cracks in the semiconductor body. These discontinuities become noticeable during usage of the hollow semiconductor bodies, as for example in semiconductor diffusion doping processes. During such processes, leaks occur rendering the diffusion container (i.e., a hollow silicon tube) nonfunctional and also disrupt the entire diffusion charge (semiconductor crystal discs or wafers and a dopant) so that the entire system has to be discarded.

SUMMARY OF THE INVENTION

The invention avoids the aforesaid prior art drawbacks and provides a means of removing a carrier member at room temperature with the aid of a concentrated highly oxidizing acid which disintegrates the carrier member and converts it to a powder-like residue which is easily removed from the formed semiconductor body. Graphite carrier members are preferably removed with 100% fuming nitric acid or chromosulfuric acid.

DESCRIPTION OF PREFERRED EMBODIMENTS

The invention provides a process for forming faultless shaped semiconductor bodies by removal of carrier members therefor at room temperatures with the aid of concentrated highly oxidizing acids.

In accordance with the principles of the invention, a deposition surface of a desired shape and composed of graphite or graphite-like material is disposed within a deposition chamber and is heated, as with electrical energy, to about 1,100° to 1,200°C. and a thermally decomposable gaseous semiconductor compound is brought into contact with the heated deposition surfaces. For example, the deposition surfaces may comprise the outer surfaces of a hollow or solid carrier member. Likewise, the deposition chamber may be defined by the interior surfaces of a suitably sealed hollow carrier member. Upon decomposition of the gaseous semiconductor compound, a semiconductor material forms as a solid layer on the deposition surface. After a desired thickness of the semiconductor material is attained, the system is cooled and the deposition surfaces are removed without destroying or cracking the formed semiconductor body by subjecting the deposition surfaces to the action of a concentrated highly oxidizing acid.

In embodiments where shaped silicon bodies are desired, silicochloroform is a preferred starting material and in embodiments where silicon carbide shaped bodies are desired, monoethyltrichlorosilane is a preferred starting material.

The rate of deposition surface (carrier member) destruction is primarily dependent upon the concentration of the acid utilized; with 100% fuming nitric acid, destruction occurs within a few minutes. On the other hand, if chromosulfuric acid (concentrated sulfuric acid having, for example, sodium bichromate dissolved therein) is used, the disintegration reaction is slower but is very protective of the shaped semiconductor body.

After the disintegration reaction is completed, the powder-like graphite residue is easily removed from a hollow semiconductor body by various means. A preferred means of removing the powder-like residue is with a water flush immediately after the disintegration reaction.

The invention is equally useful for removal of carrier members (i.e., deposition surfaces) whether a semiconductor body is formed on the outer or the inner surfaces of a carrier member.

The invention also allows the production of shaped semiconductor bodies which are thermal-stress free and have no fissures or cracks therein. Further, the invention is much more economical and faster in comparison with prior art methods.

The principles of the invention are applicable to production processes of any formed semiconductor bodies, independent of their geometry wherein the depositing or supporting surfaces are composed of a graphite-like material. Thus, one may produce complexly designed semiconductor shapes and hollow semiconductor bodies of any desired profile.

Although particular embodiments of the invention have been described and illustrated herein, it is recognized that modifications and variations may readily occur to those skilled in the art and consequently it is intended that the claims be interpreted to cover such modifications and equivalents.

We claim as our invention:

1. In a method of producing a tube composed of silicon wherein a gaseous thermally decomposable silicon compound is brought into contact with a tubular carrier member composed of graphite so that a layer of silicon is deposited in a desired thickness about the peripheral surface of the carrier member which is then removed without destroying the so-formed silicon tube, the improvement comprising:

whereby the so-formed silicon tube is removed at room temperature by subjecting the silicon-coated carrier member to 100% fuming nitric acid and flushing the so-formed silicon tube with water to remove any residual material of said carrier member remaining in the silicon tube.

2. In a method of producing a tube composed of silicon wherein a gaseous thermally decomposable silicon compound is brought into contact with a tubular carrier member composed of graphite so that a layer of silicon is deposited in a desired thickness about the peripheral surface of the carrier member which is then removed without destroying the so-formed silicon tube, the improvement comprising:

whereby the so-formed silicon tube is removed at room temperature by subjecting the silicon-coated carrier member to chromosulfuric acid and rinsing the so-formed silicon tube with water to remove any residual material of said carrier member remaining in the silicon tube.

* * * * *